US012663361B2

(12) United States Patent
Ding et al.

(10) Patent No.: US 12,663,361 B2
(45) Date of Patent: Jun. 23, 2026

(54) HYPERUNIFORM-STRUCTURED PROFILING SYSTEM

(71) Applicant: Texas Tech University System, Lubbock, TX (US)

(72) Inventors: Zhenya Ding, Lubbock, TX (US); Wei Li, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 541 days.

(21) Appl. No.: 18/037,398

(22) PCT Filed: Nov. 19, 2021

(86) PCT No.: PCT/US2021/060152
§ 371 (c)(1),
(2) Date: May 17, 2023

(87) PCT Pub. No.: WO2022/115330
PCT Pub. Date: Jun. 2, 2022

(65) Prior Publication Data
US 2024/0011889 A1 Jan. 11, 2024

Related U.S. Application Data

(60) Provisional application No. 63/116,576, filed on Nov. 20, 2020.

(51) Int. Cl.
G01N 15/14 (2024.01)
B01L 3/00 (2006.01)
(Continued)

(52) U.S. Cl.
CPC .... G01N 15/1484 (2013.01); B01L 3/502715 (2013.01); G01N 15/1434 (2013.01);
(Continued)

(58) Field of Classification Search
CPC ........... G01N 15/1484; G01N 15/1434; G01N 15/01; G01N 15/0227; G01N 15/1433;
(Continued)

(56) References Cited

U.S. PATENT DOCUMENTS 9,952,212 B2 4/2018 Martin et al.
2007/0161051 A1* 7/2007 Tsinberg .............. G01N 1/2813
435/7.2
(Continued)

FOREIGN PATENT DOCUMENTS

CN 208038418 U 11/2018
JP 5783593 B2 9/2015
(Continued)

OTHER PUBLICATIONS

Zhenya Ding, Yu Zheng, Yaopengxiao Xu, Yang Jiao, adn Wei Li. "Hperuniform flow fields resulting from hyperuniform configurations of circular disks" Physical Review E 98, 063101-1-063101-9. (Year: 2018).*
(Continued)

*Primary Examiner* — Michael L Hobbs
(74) *Attorney, Agent, or Firm* — LOZA & LOZA, LLP; Kevin L. Soules

(57) ABSTRACT

A a hyperuniform-structured microchip is configured for providing viable resolution of CTC subpopulations supporting the ability to determine whether there is a correlation between CTC heterogeneity and tumor progression, the microchip including a substrate, a microfluidic enclosure around the substrate, and a plurality of microposts configured on the substrate in a hyperuniform pattern.

18 Claims, 19 Drawing Sheets

(51) Int. Cl.

| | |
|---|---|
| *G01N 15/1434* | (2024.01) |
| *G01N 15/01* | (2024.01) |
| *G01N 15/10* | (2006.01) |

(52) U.S. Cl.
CPC ... *B01L 2200/0652* (2013.01); *B01L 2300/12* (2013.01); *B01L 2400/086* (2013.01); *G01N 15/01* (2024.01); *G01N 2015/1006* (2013.01)

(58) Field of Classification Search
CPC .... G01N 2015/1006; G01N 2015/1495; B01L 3/502715; B01L 3/502761; B01L 2200/0652; B01L 2300/12; B01L 2300/0877
See application file for complete search history.

(56) References Cited

U.S. PATENT DOCUMENTS

| | | | |
|---|---|---|---|
| 2014/0154703 A1* | 6/2014 | Skelley | B01L 3/502761 435/7.23 |
| 2017/0350882 A1* | 12/2017 | Lin | G01N 33/54353 |
| 2018/0119226 A1 | 5/2018 | Kassis | |
| 2018/0236451 A1* | 8/2018 | Lee | C12Q 1/686 |

FOREIGN PATENT DOCUMENTS

| | | |
|---|---|---|
| WO | 2011/028818 A2 | 3/2011 |
| WO | 2016/210113 A1 | 12/2016 |

OTHER PUBLICATIONS

PCT/US2021/060152. International Search Report & Written Opinion (Jun. 24, 2022).

Tan et al., Simulation of circulating tumor cell transport and adhesion in cell suspensions in microfluidic devices, Biomicrofluidics, Nov. 7, 2019, pp. 1, 3-5, 2-3.

Ding et al., Hyperuniform flow fields resulting from hyperuniform configurations of circular disks, Physical Review E, vol. 98, Issue 6, Dec. 2018.

Zhou et al., Nanoparticle modification of microfluidic cell separation for cancer cell detection and isolation, Analyst, Oct. 22, 2019, pp. 257-264.

Castleberry et al., Capillary Flow Layer-by Layer: A Microfluidic Platform for the High-THroughput Assembly and Screening of Nanolayered Film Libraries, ACS Nano, vol. 8, No. 7, 2014, pp. 6580, 6583-6584, 6587.

Ungai-Salanki et al., A practical review on the measurement tools for cellular adhesion force, Advances in Colloid Interface Science, Jul. 2019, pp. 1, 21.

Yuan et al., Colorimetric LAMP microfluidic chip for detecting three allergens: peanut, sesame and soybean, Scientific Reports, Jun. 6, 2018, pp. 1, 6.

Jiao et al., Avian photoreceptor patterns represent a disordered hyperuniform solution to a multiscale packing problem, Physical Review E, Feb. 24, 2014, pp. 022721-1, 022721-11.

Ahrens et al., Engineering cell aggregates through incorporated polymeric microparticles, Acta Biomaterialia, Aug. 4, 2017, p. 67.

Alvarez et al., Emerging Trends in Micro- and Nanoscale Technologies in Medicine: From Basic Discoveris to Translation, ACS Nano, May 19, 2017, pp. 5195-5196.

Hoshino et al., Microchip-based Immunomagnetic Detection of Circulating Tumor Cells, The Royal Society of Chemistry, Oct. 21, 2011.

* cited by examiner

200

206

Server

204

External
Drive

202

Network

210

Client

212

Client

214

Client

Storage

208

305

315

Software Application

125

Module

310

Operating
System

Interface

300

320

405

705

450

710

810

805

815

400

1200

1205
Start

1210
Fabricate test system

1215
Calibrate test system

1220
Introduce test sample

1225
Capture adhesion locations

1230
Determine cell types based on cell adhesions locations

1235
End

1400

HYPERUNIFORM-STRUCTURED PROFILING SYSTEM

CROSS REFERENCE TO RELATED PATENT APPLICATIONS

This application claims the priority and benefit under 35 U.S.C. § 119(e) of U.S. Provisional Patent Application Ser. No. 63/116,576 filed Nov. 20, 2020, entitled "HYPERUNI-FORM-STRUCTURED PROFILING SYSTEM" U.S. Provisional Patent Application Ser. No. 63/116,576 is herein incorporated by reference in its entirety.

TECHNICAL FIELD

Embodiments are generally related to the field of micro-chip design. Embodiments are further related to hyperuni-form microchip systems and methods. Embodiments are also related to identification of cells. Embodiments are further related to fractioning and profiling heterogeneous circulating tumor cells using a hyperuniform-structured microchip.

BACKGROUND

Cancer is among the most serious threats to human health ever faced. Diagnosis and treatment research has a long and storied history leading to many important discoveries as well as a multitude of misleading trails.

A milestone in cancer research was the discovery of the first cancer-causing virus by Peyton Rous in 1911 which strengthened the viral theory of cancer causation. This led to the possibility that cancer could be prevented with vaccines. What followed was an expansion of cancer and vaccine research. Those efforts, and others, led to the unfounded belief that cancer had a uniform causative factor. Decades later, these well-intentioned concepts have led to the dis-covery of many causative factors leading to more efficient research in cancer and the ability to diagnose, treat, and in some cases, cure, as well as prevent many forms of cancer.

Further research has improved our understanding. Cancer has multiple stages each of which may require different approaches for treatment depending on the stage at which it is identified, and the type of cancer. Of particular importance is the point at which cancer metastasizes. Patients experi-ence increased risk when cancer metastasizes after extrava-sation. Identifying this point is incredibly difficult, as most research is focused on the treatment and prevention of cancers rather than identification of cancer progression. As such, the current methods typically focus on identifying circulating tumor cells (CTCs) within a blood sample, noting the progression of the cancer as a result. CTC identification techniques are typically destructive, ruining any future testing, and preventing insight into whether the CTCs have the same metastatic capacities.

During the stage at which cancer metastasizes the body has a plethora of circulating tumor cells (CTCs) which have high heterogeneity leading to an array of subpopulations.

Accordingly, there is a need for systems and methods that can be used isolate, identify, and categorize, in situ, CTCs, utilizing a hyperuniform microchip structures. Such sys-tems, methods, and apparatuses are disclosed herein.

SUMMARY

The following summary is provided to facilitate an under-standing of some of the innovative features unique to the embodiments disclosed and is not intended to be a full description. A full appreciation of the various aspects of the embodiments can be gained by taking the entire specifica-tion, claims, drawings, and abstract as a whole.

It is, therefore, one aspect of the disclosed embodiments to provide a microchip design.

It is another aspect of the disclosed embodiments to provide systems and apparatuses for hyperuniform micro-chip testing systems.

It is another aspect of the disclosed embodiments to provide methods and systems for identifying tumor cells.

It is another aspect of the disclosed embodiments to provide methods, systems, and apparatuses for fractioning and profiling heterogeneous circulating tumor cells using a hyperuniform-structured microchip.

It will be appreciated that the methods and systems can be achieved according to the embodiments disclosed herein. For example, in certain embodiments, a hyperuniform-structured microchip is disclosed, which is capable of pro-viding viable resolution of CTC subpopulations leading to the ability to determine whether there is a correlation between CTC heterogeneity and tumor progression.

In an embodiment, a system comprises a substrate, a microfluidic enclosure around the substrate, and a plurality of microposts configured on the substrate in a hyperuniform pattern. In an embodiment, the plurality of microposts comprises at least one of: columns, squares, and triangles. In an embodiment, the hyperuniform pattern further comprises multiple zones with different hyperuniform patterns.

In an embodiment, the system further comprises a fluidic input to the microfluidic enclosure configured to accept cells and a fluidic output from the microfluidic enclosure config-ured to accept cells.

In an embodiment, the substrate and the microfluidic enclosure are configured of at least one of: Polydimethylsi-loxane, Polyethylene, Polycarbonate, Cyclo-olefin copoly-mer, and Polylactic acid.

In an embodiment, the substrate further comprises a nanostructured layers and positively-charged polymers. In an embodiment, the nanostructured layer comprises a silicon dioxide nanoparticle layer with a size of 5-200 nm. In an embodiment, the positively-charged polymers comprise at least one of a poly-L-arginine layer, a poly(allylamine hydrochloride) layer, a Poly-L-lysine layer, a low molecular weight chitosan layer, and a Diethylaminoethyl Dextran.

In an embodiment, the system further comprises a surface coating applied to the substrate and the plurality of micropo-sts comprising: negatively-charged polymers and positively-charged polymers. In an embodiment, the negatively-charged polymers comprises at least one of: biotinylated alginate, Alginate, and Hyaluronic acid. In an embodiment, the positively-charged polymers comprise at least one of poly-L-arginine, a poly(allylamine hydrochloride) layer, a Poly-L-lysine layer, a low molecular weight chitosan layer, and a Diethylaminoethyl Dextran. In an embodiment, the surface coating further comprises at least one antibody that targets an antigen overexpressed on cancer cells. In an embodiment, the antibody comprises at least one of an Anti-EpCAM, an Anti-HER2, an Anti-EGFR, and a surface antigen on a cell surface, comprising one of Anti-CD4 and Anti-CD8.

In an embodiment, the system comprises an imaging device, the imaging device configured to capture image data of flow patterns of fluid and cell movement in the micro-fluidic enclosure. In an embodiment, the imaging device comprises at least one of a camera, a video camera, and a microscope.

In an embodiment, the system further comprises a computer system, said computer system comprising: at least one processor and a computer-usable medium embodying computer program code, the computer-usable medium capable of communicating with the at least one processor, the computer program code comprising instructions executable by the at least one processor and configured for: accepting input of the image data from the image device, determining flow rate data associated with cell flow through the microfluidic enclosure, and identifying at least one cell type according to the flow rate data.

In another embodiment, a method for cell identification comprises introducing a cell sample to a microchip comprising a hyperuniform configuration of microposts, capturing flow rates of the cell sample at least one location on the microchip, integrating images of the microchip to identify a flow field in the microchip, determining an adhesion force of at least one cell in the cell sample according to the captured flow rate, identifying locations on the microchip for capture certain types of cells based on cell-surface interaction, and identifying the at least one cell in the cell sample according to the determined adhesion force.

In an embodiment, microchip further comprises a substrate, a microfluidic enclosure around the substrate, a fluidic input to the microfluidic enclosure configured to accept cells, and a fluidic output from the microfluidic enclosure configured to accept cells.

In an embodiment the method further comprises applying a surface coating to the substrate and the plurality of microposts comprising: biotinylated alginate, Alginate, Hyaluronic acid, a poly-L-arginine layer, a poly(allylamine hydrochloride) layer, a Poly-L-lysine layer, a low molecular weight chitosan layer, and a Diethylaminoethyl Dextran.

In another embodiment, a microchip test system comprises a substrate, a microfluidic enclosure around the substrate, a plurality of microposts configured on the substrate in a hyperuniform pattern, an imaging device, the imaging device configured to capture image data of flow patterns of fluid and cell movement in the microfluidic enclosure; and a computer system, said computer system comprising: at least one processor; and a computer-usable medium embodying computer program code, the computer-usable medium capable of communicating with the at least one processor, the computer program code comprising instructions executable by the at least one processor and configured for: accepting input of the image data from the imaging device, determining flow rate data associated with cell flow through the microfluidic device, and identifying at least one cell type according to the flow rate data.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
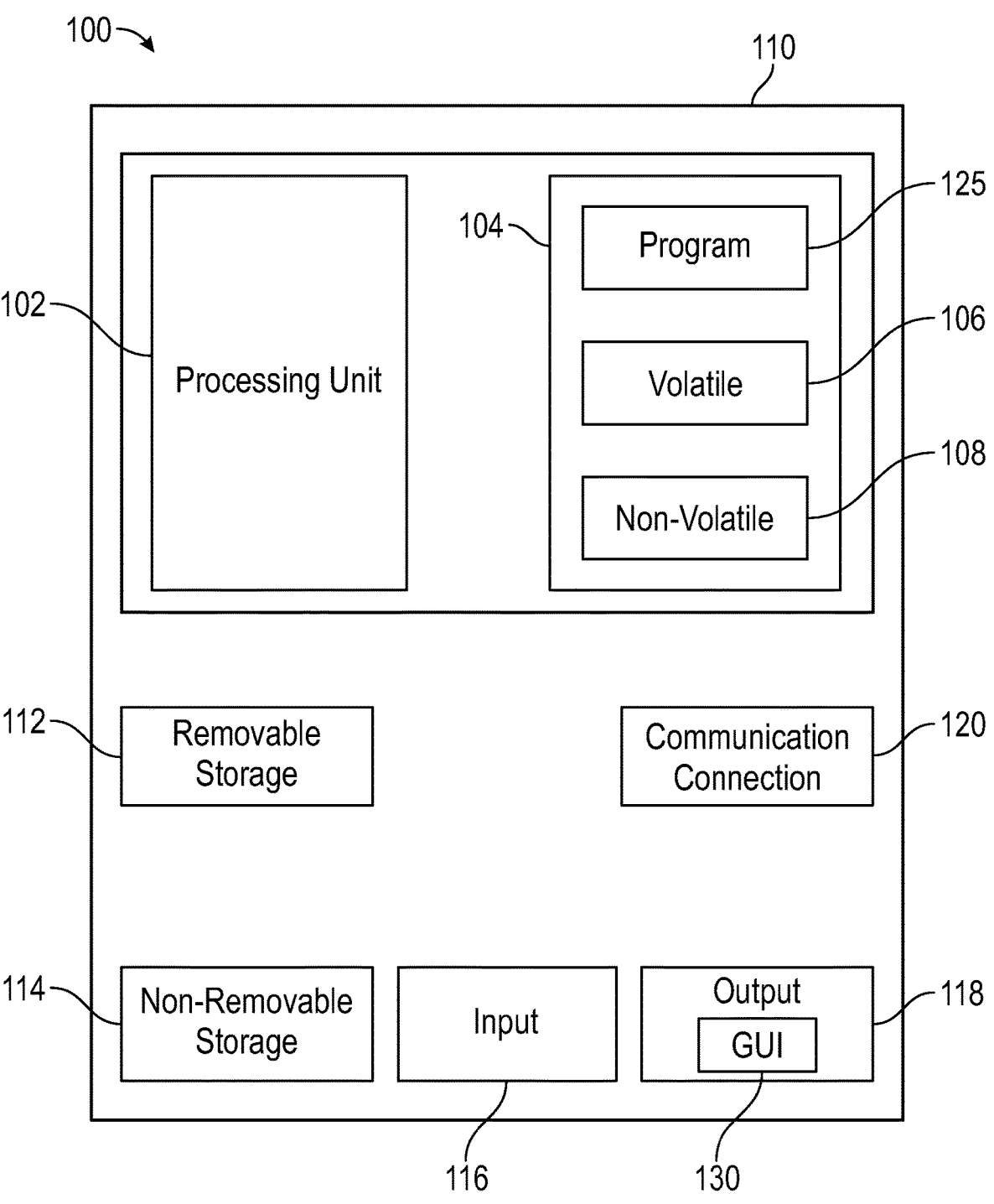
FIG. 1 depicts a block diagram of a computer system which is implemented in accordance with the disclosed embodiments.

Embodiments and aspects of the disclosed technology are presented herein. The particular embodiments and configurations discussed in the following non-limiting examples can be varied, and are provided to illustrate one or more embodiments, and are not intended to limit the scope thereof.

Reference to the accompanying drawings, in which illustrative embodiments are shown are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Figure 2:
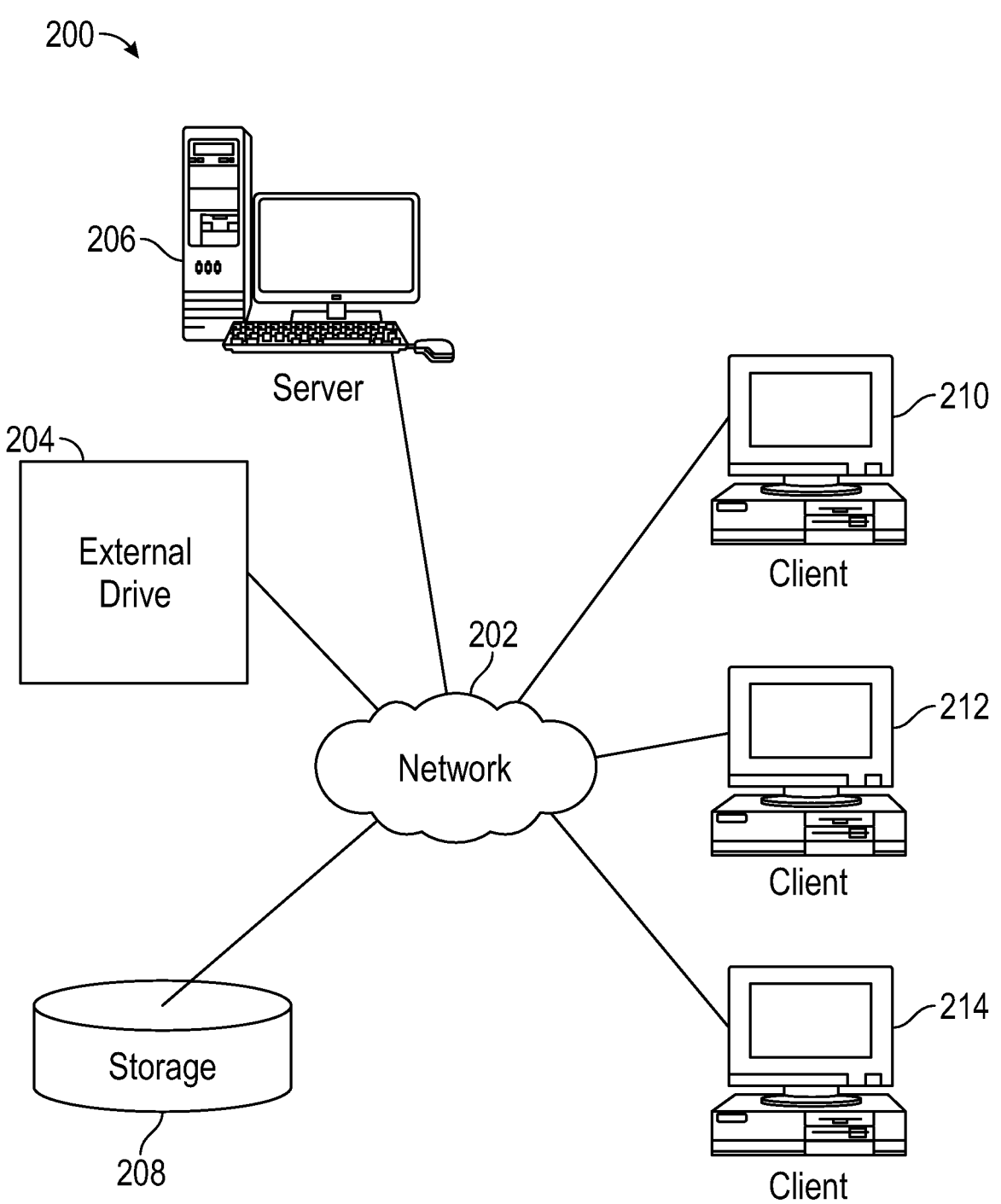
FIG. 2 depicts a graphical representation of a network of data-processing devices in which aspects of the present embodiments may be implemented.
Figure 3:
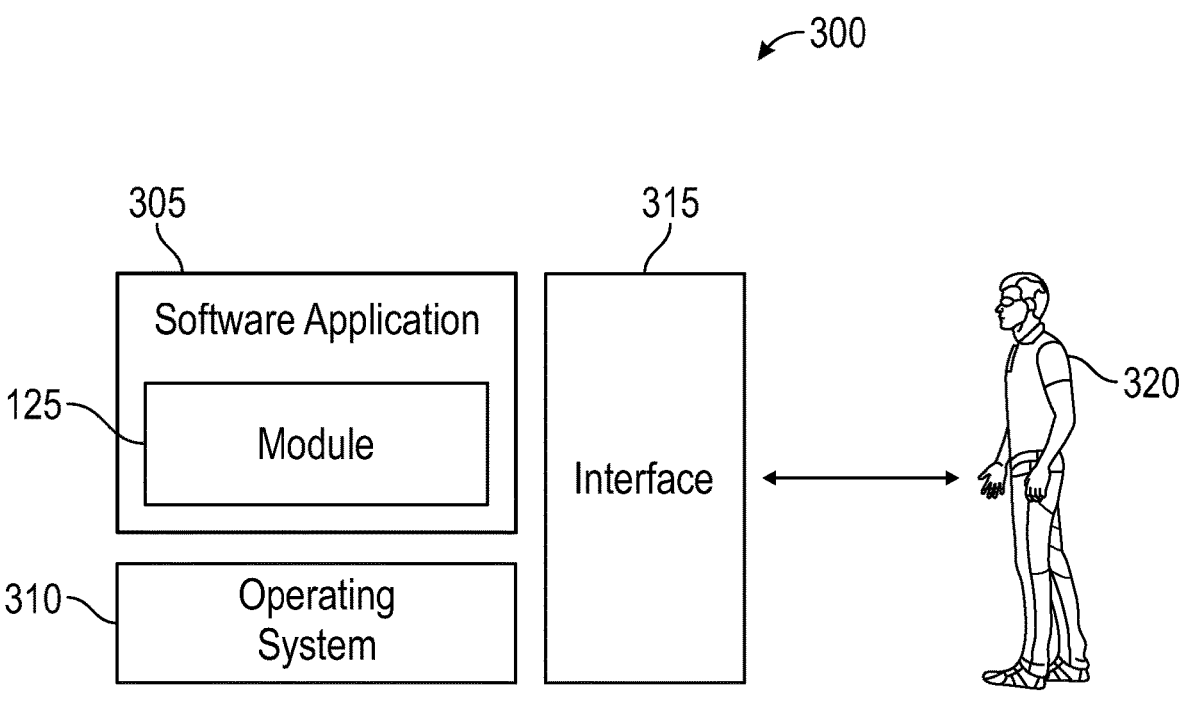
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is provided in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to input instructions to computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, testing apparatus, imaging device or other such device.

In the depicted example, device 204, server 206, and clients 210, 212, and 214 connect to network 202 along with storage unit 208. Clients 210, 212, and 214 may be, for example, personal computers or network computers, hand-held devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, micro-processor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied in a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to a hyperuniform-structured microchip capable of providing viable resolution of CTC subpopulations leading to the ability to determine whether there is a correlation between CTC heterogeneity and tumor progression. In an exemplary embodiment, the disclosed systems include a substrate with a microfluidic enclosure around the substrate and a plurality of microposts, or other structures, including but not limited to squares, triangles, etc., configured on the substrate in a hyperuniform pattern. In other embodiments, the hyperuniform pattern can be arranged in multiple zones with different hyperuniform patterns. The system includes a fluidic input to the microfluidic enclosure configured to accept cells and a fluidic output from the microfluidic enclosure configured to accept cells. In certain embodiments, the substrate and the microfluidic enclosure are configured of Polydimethylsiloxane. It should be understood that other polymers used for microfluidic chips such as polyethylene, polycarbonate, Cyclo-olefin copolymer; and Polylactic acid. etc., can also be used.

Figure 13:
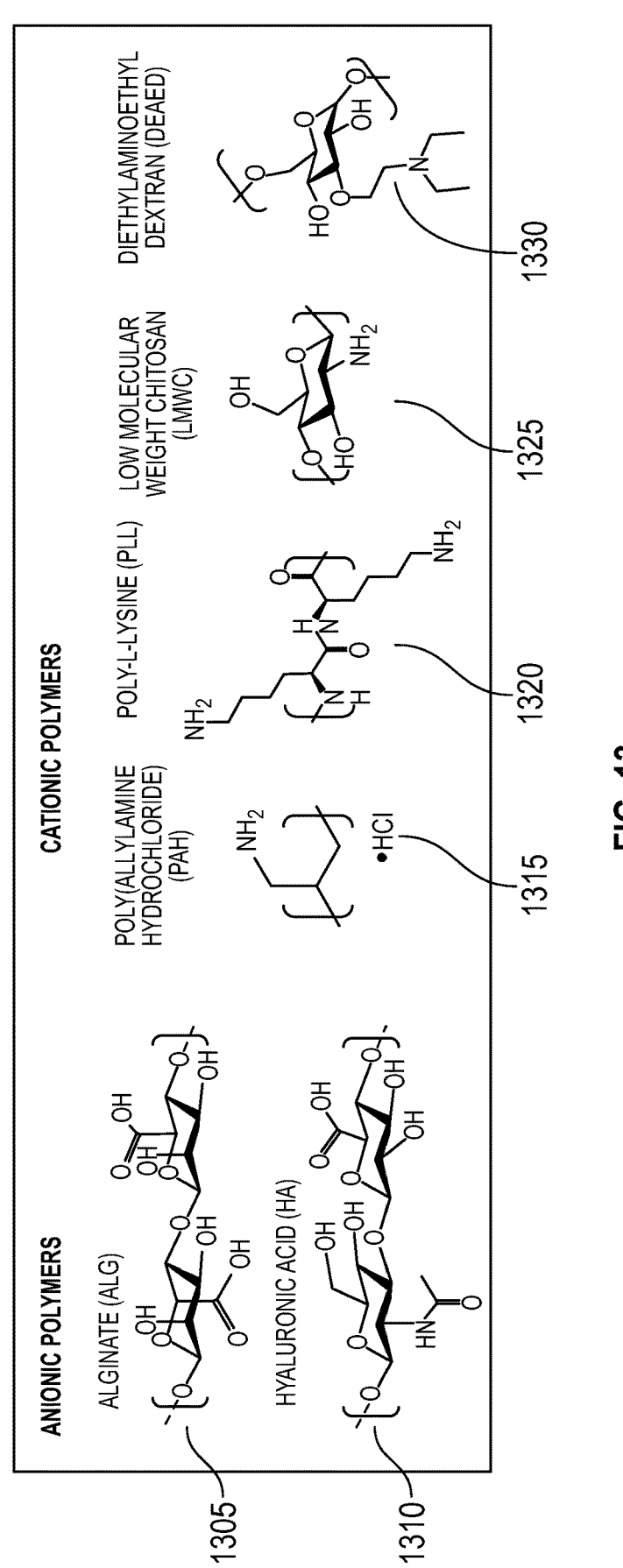
FIG. 13 illustrates a materials chart of materials that can be used in association with the disclosed embodiments.

In certain embodiments, the substrate can further include a silicon dioxide nanoparticle layer 406 (or any other such nanostructured layers); and at least one of a poly-L-arginine layer, a poly(allylamine hydrochloride) layer, a Poly-L-lysine layer, a low molecular weight chitosan layer, and a Diethylaminoethyl Dextran. These materials are illustrated in the materials chart 1300 illustrated in FIG. 13. Such materials can include anionic polymers such as Alginate 1305 and Hyaluronic acid 1310; and cationic polymers including Poly(allylamine hydrochloride 1315, Poly-L-lysine 1320, Low Molecular Weight Chitosan 1325, and Diethylaminoethly Dextran 1330. More generally, other positively-charged polymers can also be used.

A surface coating can be applied to the substrate and the microfluidic posts. The coating can be biotinylated alginate, Alginate 1305, Hyaluronic acid 1310, or other negatively-charged polymers, and poly-L-arginine 1315 or other positively-charged polymers. These material are illustrated in the materials chart illustrated in FIG. 13. The surface can contain at least one antibody (e.g., Anti-EpCAM, Anti-HER2, an Anti-EGFR, and a surface antigen on a cell surface, comprising one of Anti-CD4, and Anti-CD8) that targets the antigen overexpressed by cancer cells. Antibody density can be adjusted. Multiple antibody mixtures or cocktails can be used for targeting specific cancer cells or other cell types (i.e., immune cells, stem cells, or bacterial, etc.).

The system can further include an imaging device 204 configured to capture image data of flow patterns of fluid and cell movement in the microfluidic enclosure. The imaging device can be a camera, a video camera, or other such imaging device 204. The imaging device 204 can also comprise an imaging system comprising a microscope 445 and an imaging device configured to collect images of very small objects (e.g., cells and microposts). A computer system, can be used to accept input of the image data from the image device, determine flow rate data associated with cell flow through the microfluidic device, and identify at least one cell type according to the flow rate data.

Figure 4:
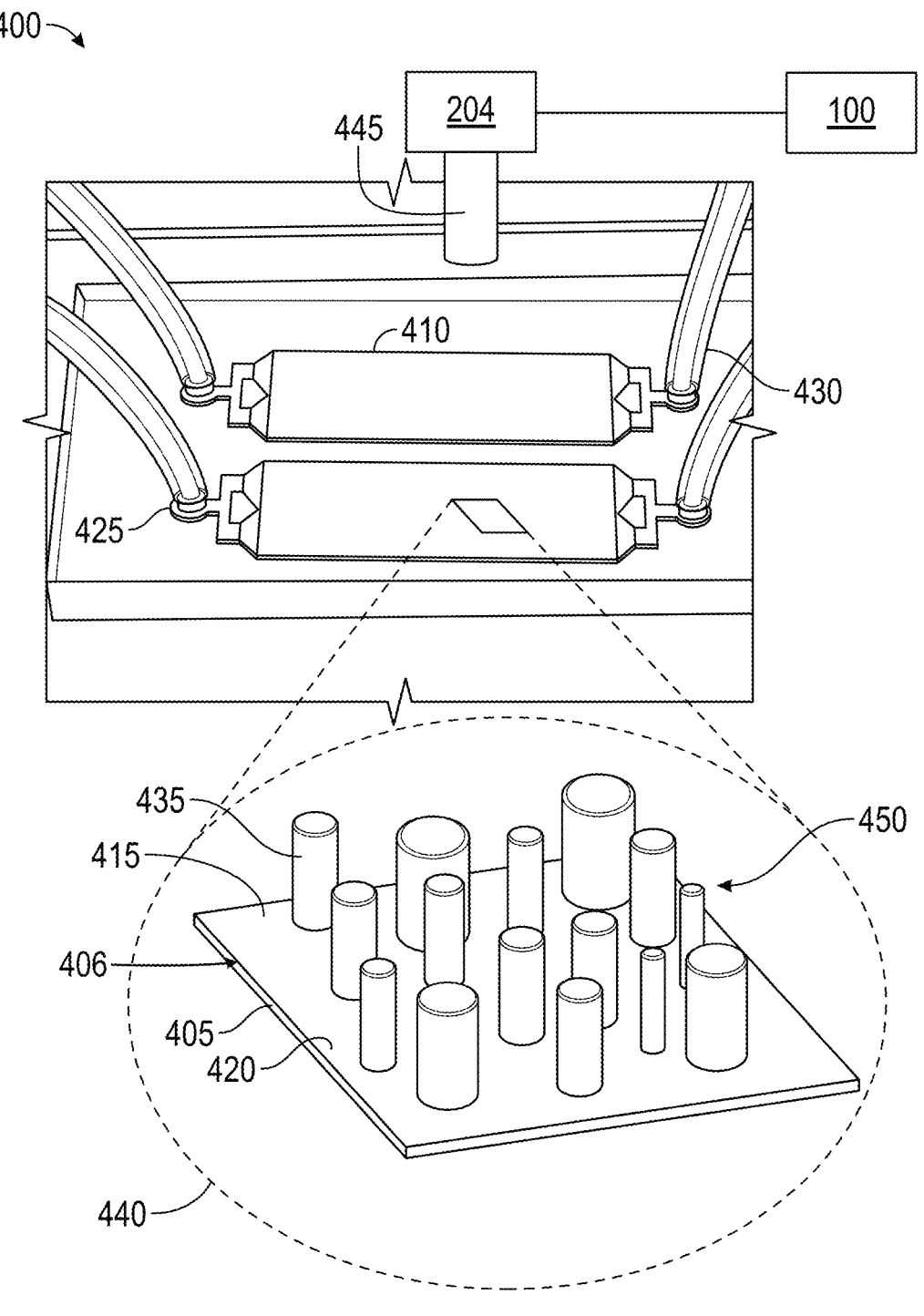
FIG. 4 depicts a testing system, in accordance with the disclosed embodiments.

A testing system 400 is illustrated in FIG. 4. The testing system 400 can comprise a substrate 405. In general, the testing system 400 can comprise a microfluidic device or microchip. The substrate 405 can comprise a polydimethylsiloxane (PDMS) substrate which can be fabricated using standard soft lithography. The substrate can be sealed with a cover 410 as required to establish a fluidic pathway. The inner surfaces 415 of the microfluidic device can comprise biodegradable nanofilms 420. The biodegradable nanofilms can be 20-50 nm thick and can be assembled with layer by layer assembly techniques. In certain embodiments, such films can comprise Biotin-Alginate (BALG) and poly-L-arginine (PARG), although other material can also be used.

The testing system 400 can comprise a fluidic input 425 and a fluidic output 430. The fluidic input 425 serves as the input through which a test fluid is introduced to the microchip.

The surface of the substrate 405 can be configured with a series of microposts 435 arranged in a hyperuniform pattern. An exploded view 440 of the substrate 405 and microposts 435 is provided in FIG. 4. The arrangement of posts is specially selected to be a hyperuniform pattern. The testing system 400 can further include an imaging device 204 including a microscope 445, operably connected to a computer system 100.

Hyperuniformity, as disclosed herein, represents an optimal way to arrange heterogeneous objects, and can have a packing pattern characterized by local heterogeneity or randomness, but global regularity or homogeneity. A hyperuniform distribution appears to be random, but the distribution is actually uniform. In principle, hyperuniform distributions are locally disordered, but density fluctuations grow in proportion to perimeter, rather than area (in two dimensions). This means that the large-scale density of the distribution is just as uniform as other natural structures.

The computer system 100 and associated software, can be used to generate two-dimensional hyperuniform configurations of micro posts 435 (or other such posts) with various packing densities using stochastic optimization. This can be translated into hyperuniform configurations of posts which in turn, can lead to hyperuniform flow fields for small packing densities ($\varnothing<0.35$) and inlet pressures (P0<10 Pa).

The disclosed testing system 400 takes advantage of the local flow patterns of the microchip configured with a hyperuniform post pattern 450. The resulting controlled differences in local flow patterns induced by the hyperuniform structure, causes cell arrest in different locations on the microchip 400, which require different cell adhesion strengths. Adhesion parameters of various cells differ according to the characteristics of the cell. Thus, the flow pattern can be used to identify the adhesive strength of cells, which can in turn be used identify the types and densities of surface markers on the captured CTCs. From there it is relatively simple to identify the associated metastatic character. The system 400 can thus, be used to selectively separate individual groups of CTCs on demand for downstream bio-analyses.

Figure 5:
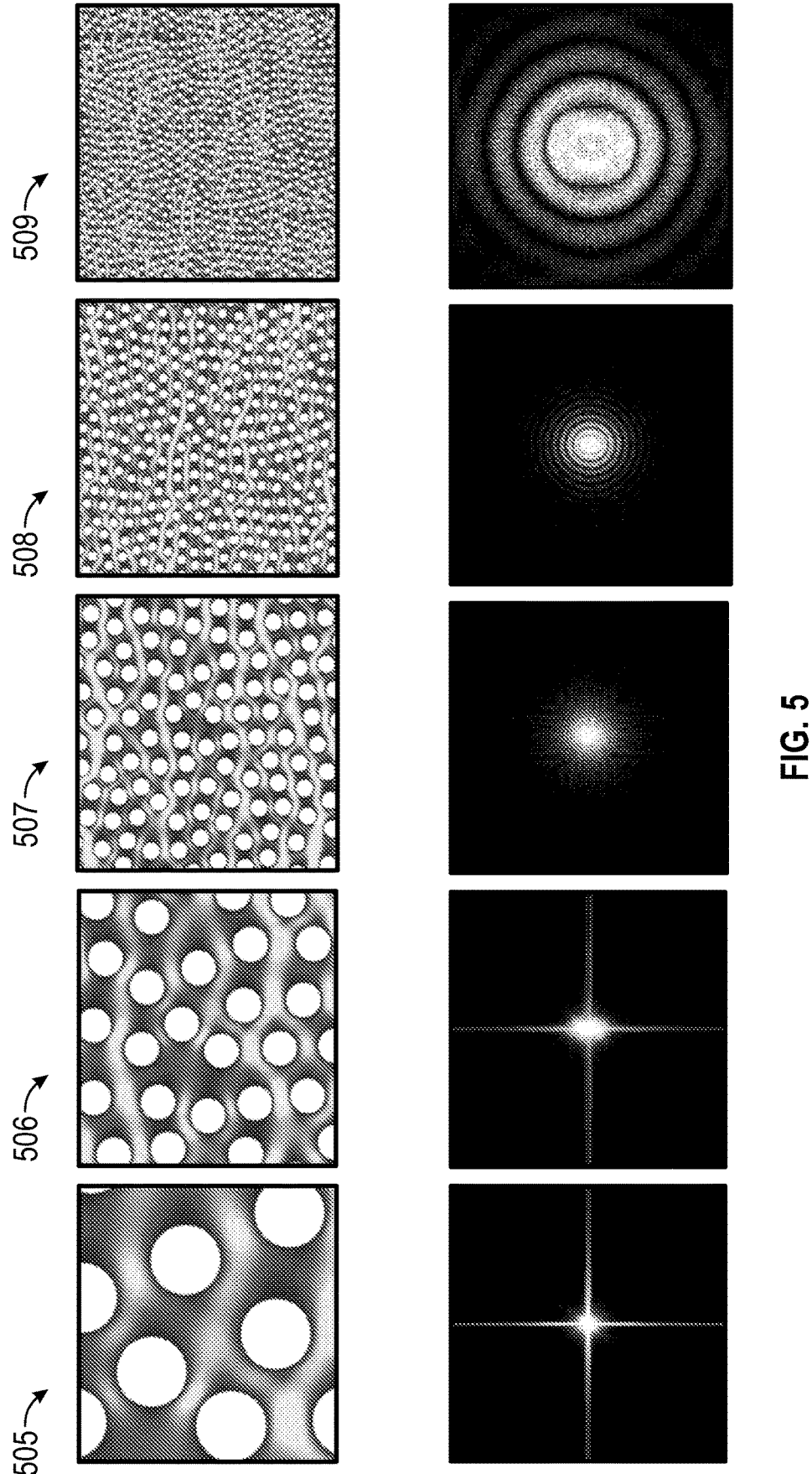
FIG. 5 depicts spectral analysis of flow fields, in accordance with the disclosed embodiments.
Figure 5:
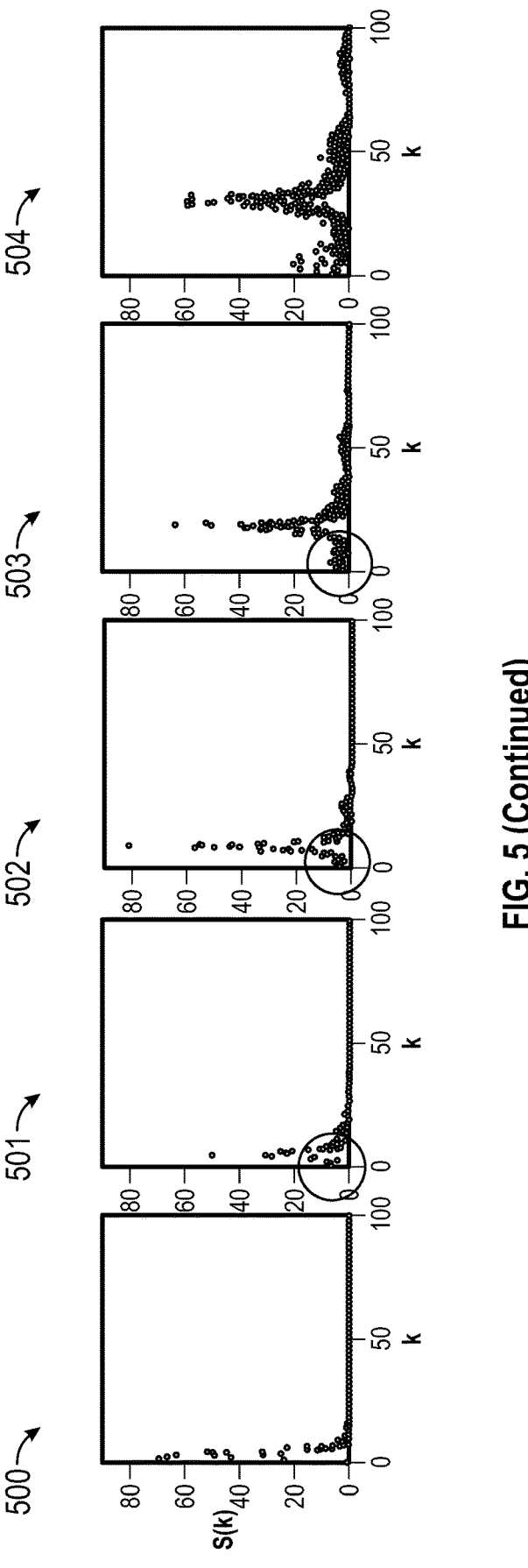

In certain embodiments, selected operating parameters will improve the function of the system 400. For example, the hyperuniform characteristic of the flow is visible in an area of 1000×1000 μm^2, and the flow becomes more hyperuniform after that. As such, it may be beneficial to define "observations areas" on or about this size, for the camera system to capture. FIG. 5 illustrates spectral analysis charts 500-504 of the flow fields associated with observation areas 505-509 in accordance with the disclosed embodiments.

Figure 6:
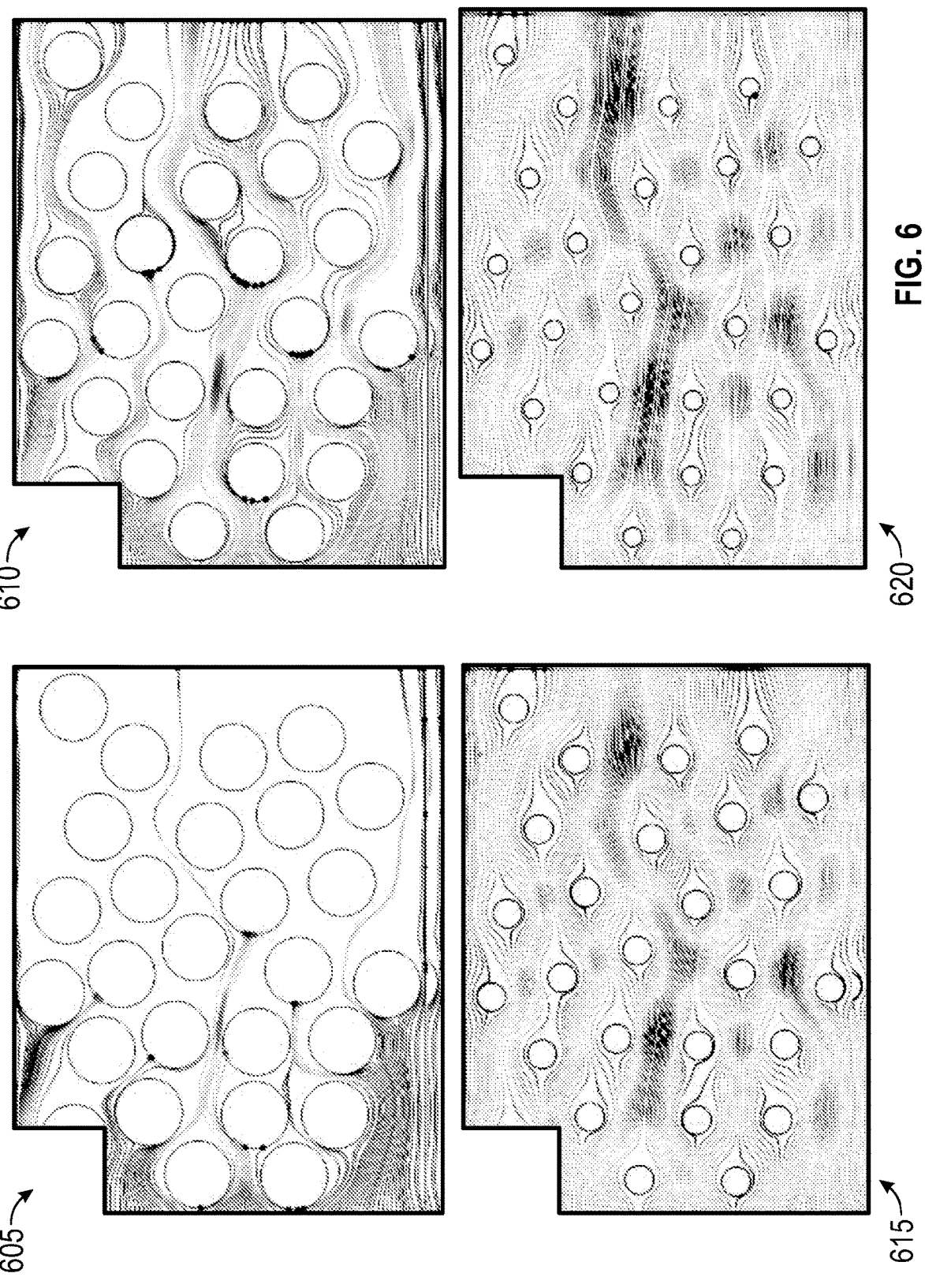
FIG. 6 depicts cells moving through a testing system, in accordance with the disclosed embodiments.

Similarly, an optimal diameter of the micro poles or microposts can be determined according to the operational constraints. The goal is to set the pole diameter to maximize the possibility of passing cells contacting the posts. If the posts are made too large, they will block cell progression near the inlet and only a few cells will reach the outlet. Conversely, if the posts are too small, the wide gaps between the posts will result in most of the cells reaching the outlet without contacting any post. This is illustrated in flow chart 605 with large posts; flow chart 610, with smaller posts; flow chart 615, with still smaller posts; and flow chart 620 with the smallest posts, in FIG. 6. In certain embodiments, posts with a diameter of approximately 100 μm may be optimal, but post size should be adjusted to the specific cell capture application.

Hyperuniform post patterns are unique in that they result in a local uniform flow velocity. In certain embodiments, the flow velocity can be controlled by controlling the inlet pressure and by configuring the hyperuniform pattern with a specific density and post diameter. For example, the flow velocity generated by the 0.1 mL/hr inlet flow is in the range of 0-5 mm/s, and it is comparable with standard blood stream velocity (0-16 mm/s).

In certain embodiments, a master mold for the testing system can be designed using a computer system 100 to generate the desired hyperuniform post pattern 450 as disclosed above. The substrate 405 and post pattern 450 can then be printed, cast, or otherwise fabricated. In certain embodiments, a 100 μm layer of SU-8-50 can be spin coated on the surface of the mold. UV can be applied though the mask (UV generated can be 40 watts/cm2), to complete the master mold. The master mold can then be used to reproduce the substrate with microposts.

Figure 7A:
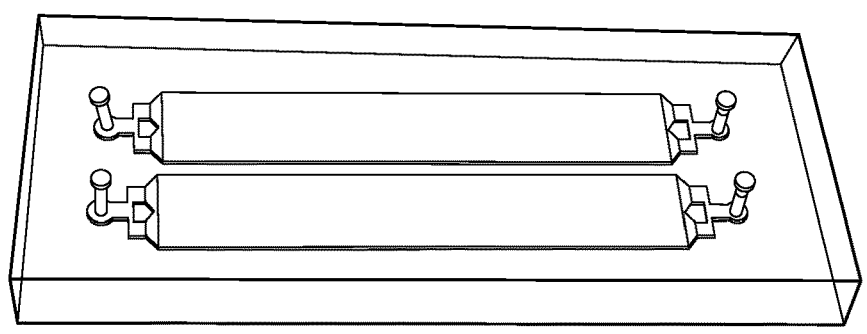
FIG. 7A depicts a testing system, in accordance with the disclosed embodiments.
Figure 7B:
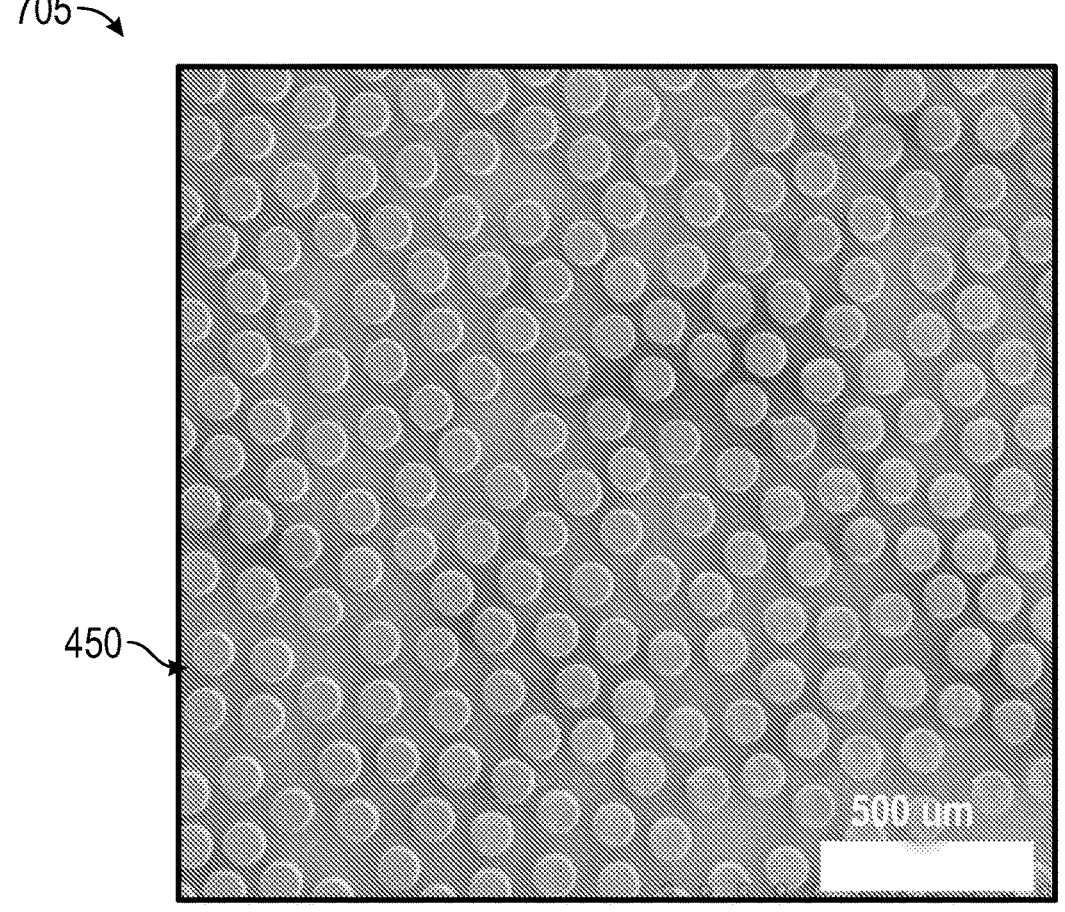
FIG. 7B depicts a testing system, in accordance with the disclosed embodiments.
Figure 7C:
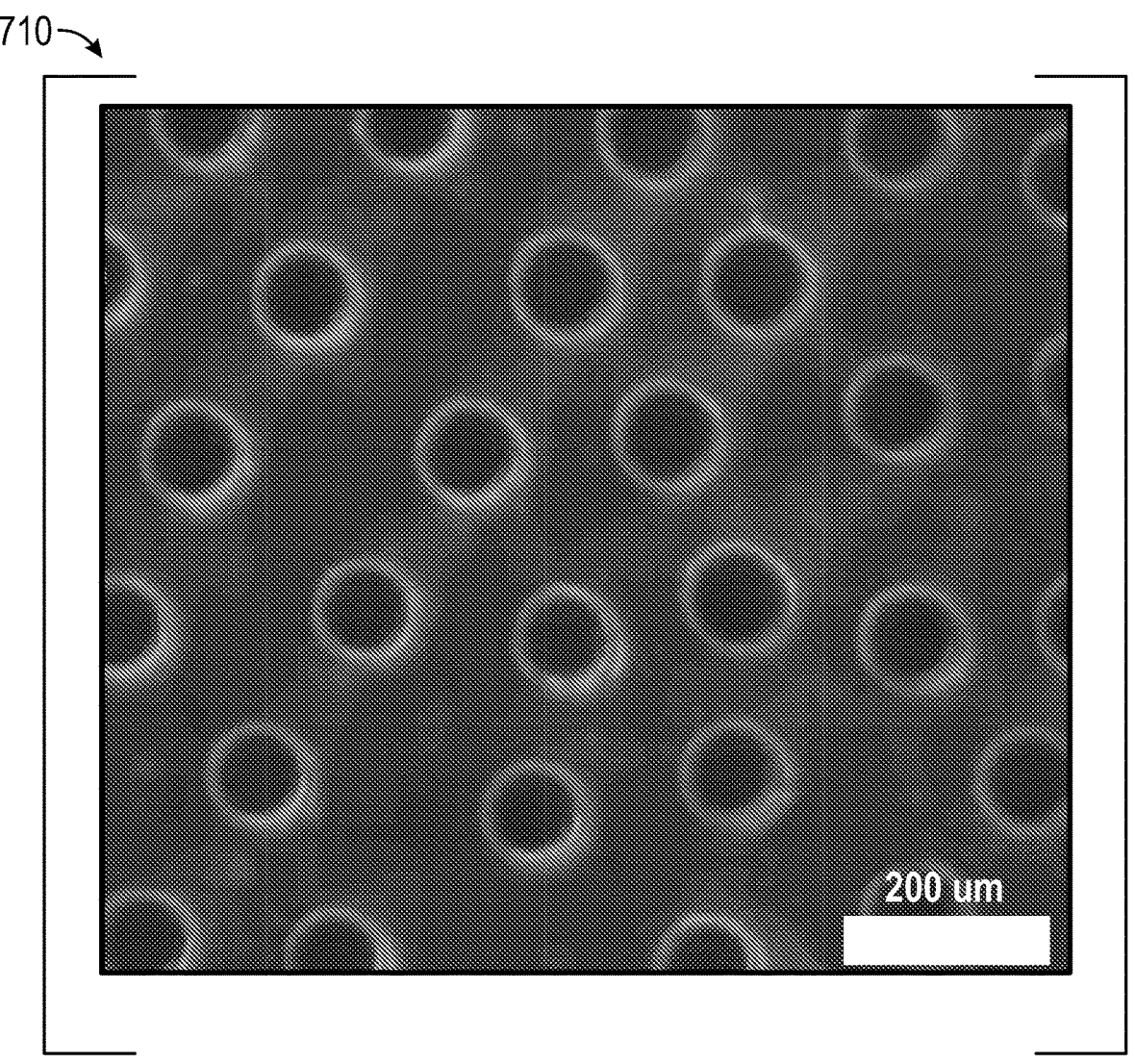
FIG. 7C depicts Texas red avidin with a uniform and bright fluorescent signal, in accordance with the disclosed embodiments.

To enhance the capture efficiency, two base layers of BPEI and fumed $SiO_2$ can be introduced on the substrate. The base layers increase the surface roughness. Nano scale surface roughness can significantly enhance binding efficiency of passing cells to posts. Furthermore, to ensure the capture and release of the cells, additional bilayers of the PDDA and B-Alg film can be built to fix the Anti-Epcam. B-Alg can be degraded by the enzyme with high efficiency which gives the film the ability to release the cells. By taking advantage of the antibody antigen interaction, the cells can be captured in the channel surface. FIG. 7A, illustrates an embodiment of the microchip 405. FIG. 7B further provides an SEM image 705 of the posts in a hyperuniform pattern 450 with the nano scale rough surface, and a mold, and the 2 base layers. Photograph 710 shows Texas red avidin with a uniform and bright fluorescent signal in FIG. 7C which is indicative of successful LbL deposition.

Figure 8A:
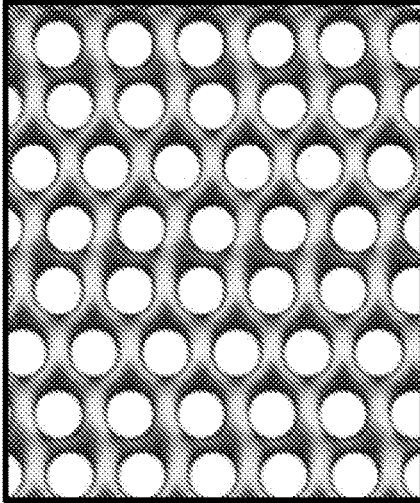
FIG. 8A depicts a non-hyperuniform post pattern and associated flow field, in accordance with the disclosed embodiments.
Figure 8B:
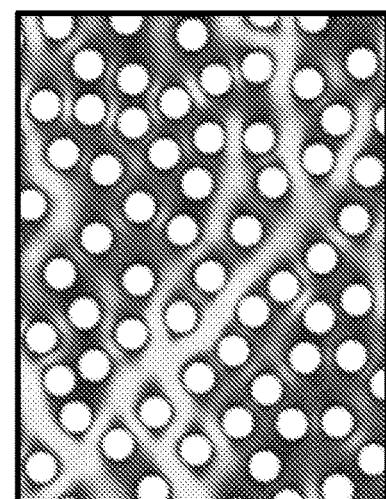
FIG. 8B depicts a hyperuniform post pattern and associated flow field, in accordance with the disclosed embodiments.
Figure 8B:
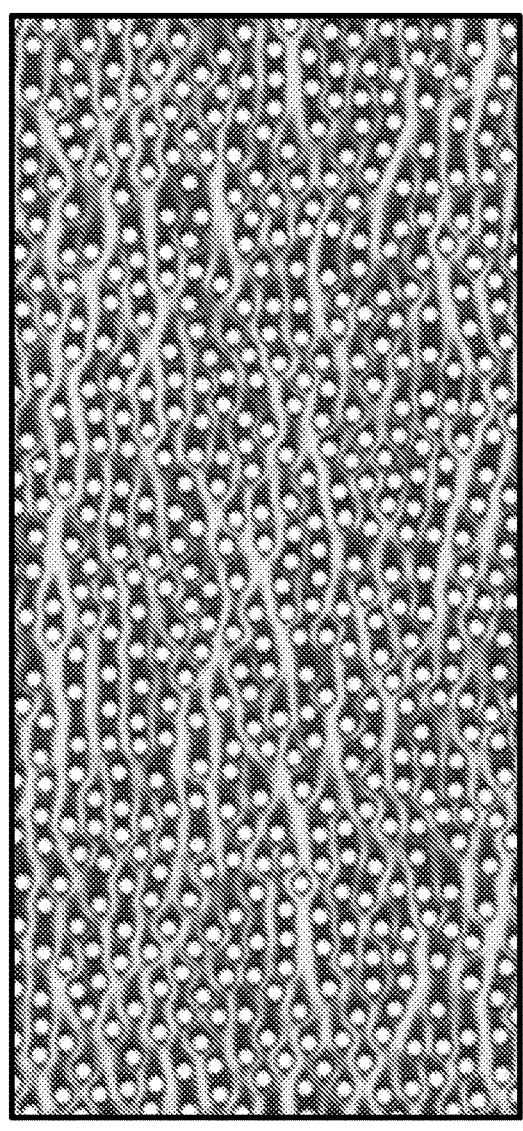

An exemplary illustration of a PC3 cell mixture (5000 cells/mL) in a regularly patterned post chip 805 in FIG. 8A is provided for comparison to a hyper uniform microchip 400 as illustrated in FIG. 8B. FIG. 8A shows the regularly patterned posts and associated flow fields 810. FIG. 8B illustrates the hyperuniform patterned posts and flow fields 815. Of particular note, the flow fields 810 through the regular patterned chip 805 as compared to the highlighted flow fields 815 in the hyper uniform patterned chip 400, illustrate the significant improvement in flow field which makes the identification of various cell types possible according to the disclosed embodiments. This improvement can be characterized as varying flow velocities at various locations on the chip 400.

Figures 9A, 9B:
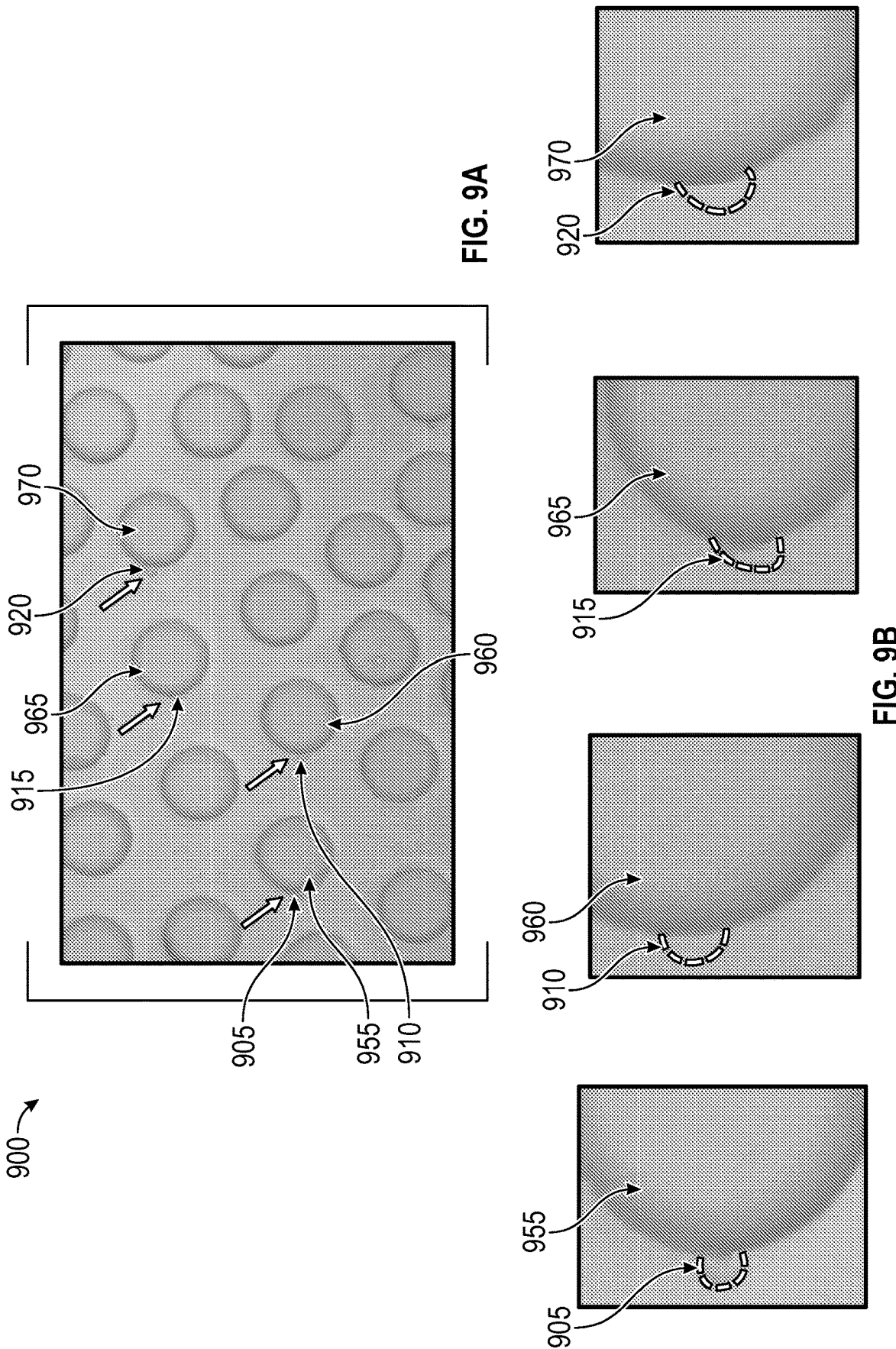
FIG. 9A depicts cells adhered to posts in a testing system, in accordance with the disclosed embodiments.
FIG. 9B depicts exploded views of cells adhered to posts in a testing system, in accordance with the disclosed embodiments.

FIGS. 9A and 9B illustrate the operating principle of the disclosed embodiments. FIG. 9A illustrates an optical image 900 of the cell 905, cell 910, cell 915, and cell 920 captured using the disclosed systems. The arrows identify cell 905 adhered to post 955, cell 910 adhered to post 960, cell 915 adhered to post 965, and cell 920 adhered to post 970. Zoomed images of cell 905, cell 910, cell 915, and cell 920 in FIG. 9A are shown in FIG. 9B. The critical point is that the shape of the cell's deformation is indicative of the adhesion forces between the cells and posts. Cell adhesion to the posts is a function of the antibody antigen interaction. The deformation of the cells is indicative of the drag force on the cell from the local flow round the cells. Cells with more antigen on their surface will have the ability to adhere to post positions that are subject to higher drag forces. That is to say, the cells with more antigen will experience a stronger affinity to a post and can remain bound to the post even when the flow velocity near that post is higher. As such, the antigen level of a given cell can be correlated to the flow field at a post, which can in turn be used to identify the cell subtype.

Figures 10A, 10B:
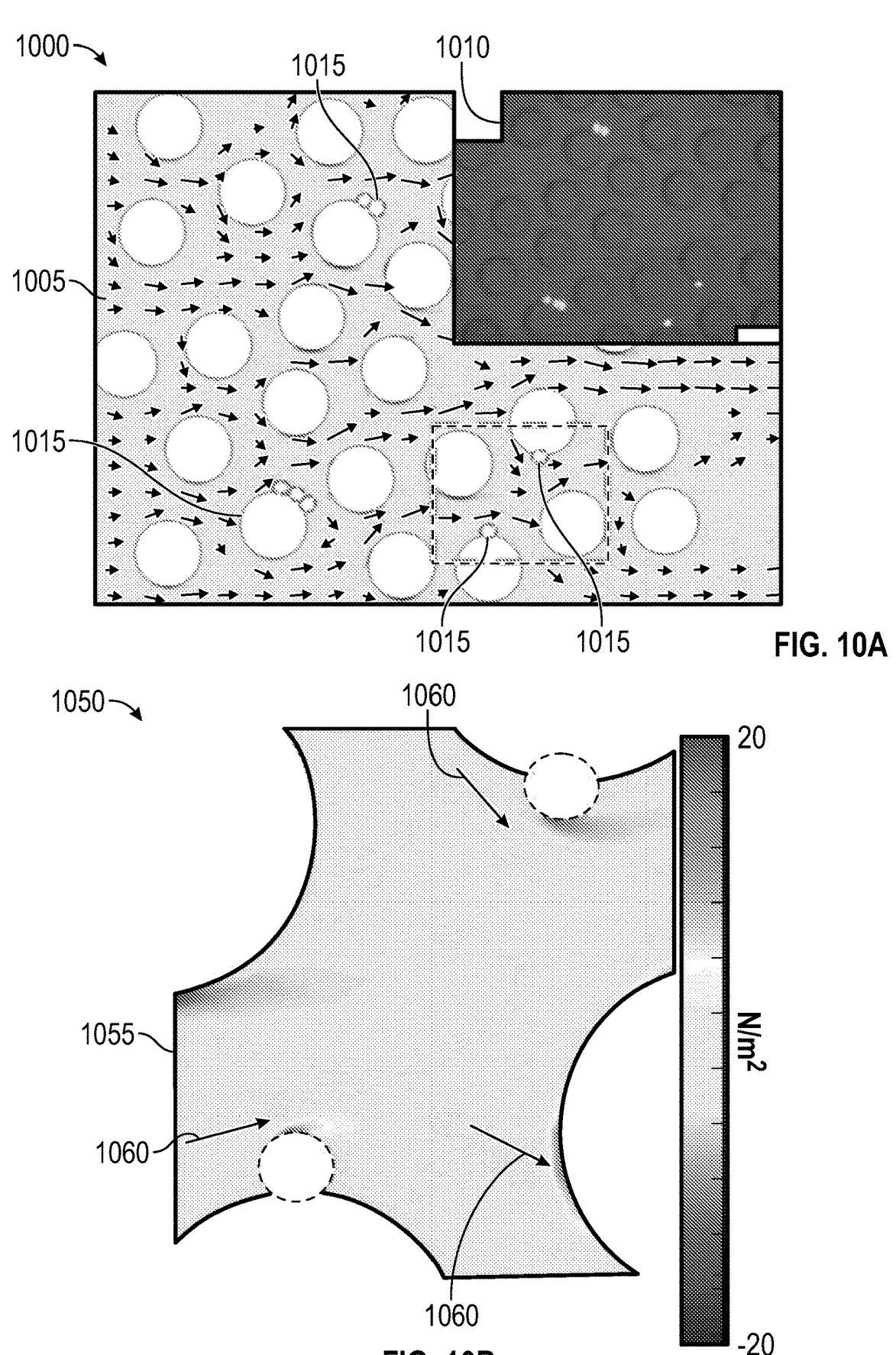
FIG. 10A depicts flow progression around a hyperuniform post pattern, in accordance with the disclosed embodiments.
FIG. 10B depicts pressure around a hyperuniform post pattern, in accordance with the disclosed embodiments.

Drag force can be calculated using the Stokes' drag equation. The location of cells can be collected with an imaging device as disclosed herein. FIG. 10A provides a diagram 1000 of flow patterns 1005 with cells bound to posts. FIG. 10B shows an extracted image 1010 of a flow field where the brighter dots represent the cells. Flow velocity illustrated in this figure ranges from 0-5 mm/s and the local velocities for each cell were listed in the table 1:

TABLE 1

| Name | V (mm/s) | Fd (nN) |
|------|----------|---------|
| Cell_1 | 0.16 | 0.075 |
| Cell_2 | 0.11 | 0.053 |
| Cell_3 | 0.39 | 0.155 |
| Cell_4 | 1.1 | 0.315 |
| Cell_5 | 0.083 | 0.044 |
| Cell_6 | 0.32 | 0.220 |
| Cell_7 | 1.42 | 0.892 |
| Cell_8 | 0.63 | 0.434 |
| Cell_9 | 0.55 | 0.244 |

As illustrated in FIG. 10, the drag force can be between 100 to 400 pN. The average single antibody-antigen binding force is 244±22 pN, which means only 1 or 2 EpCAM antibody and antigen conjugations could be enough to prevent movement of the cells. However, most areas of the hyperuniform chip are in the low flow range, so the absolute velocity difference of the local flow is limited, and the shape of the cells is very similar, which can lead to a very close drag coefficient. If the drag force applied on the cells is too close, the drag force will not give a clear identification of the cell subtypes.

Shear force may therefore offer additional information. After cells are captured on the walls of the posts, drag force becomes much smaller than the antibody-antigen conjugation force, and the shear stress applied on the cells from the surrounding flow is the primary force acting to detach the cells from the wall. The captured cells will therefore experience different local shear stresses according to their location and the associated flow at that location, and the ability of the cells to remain adhered to the post under different shear stresses is indicative of the interaction between the cells and walls. Since the adhesion is primarily a function of the antigen and antibody conjugation, the cell's adhesion position can be related to the surface EpCAM expression level by measuring the shear stress. Different shear stress applied on the cells can be calculated either empirically, or via modeling software.

FIG. 10A illustrates a flow pattern around posts as disclosed herein. The small circles 1015 around the posts indicate cell positions. An image of the positions of captured cells, which can be taken with the disclosed imaging system, is also provided in FIG. 10A. The figure also illustrates the shear stress around the cells. In FIG. 10B a provides a close up view 1050 of a pressure field 1055. The arrows 1060 indicate the flow direction and velocity.

Figure 11B:
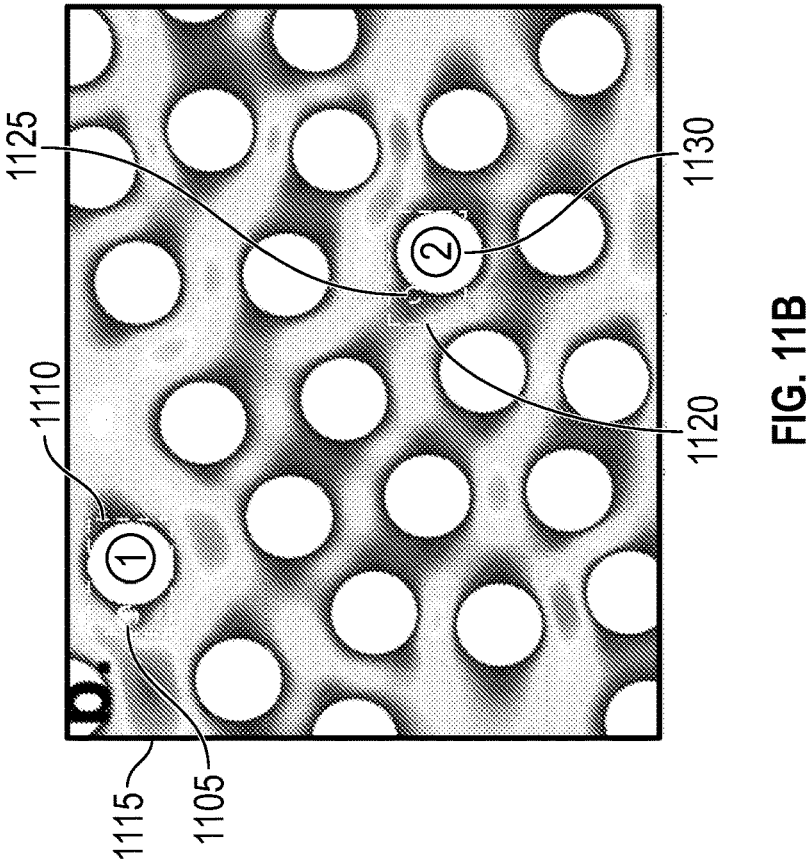
FIG. 11B depicts cells adhered to posts and associated flow fields in a test system, in accordance with the disclosed embodiments.
Figure 11A:
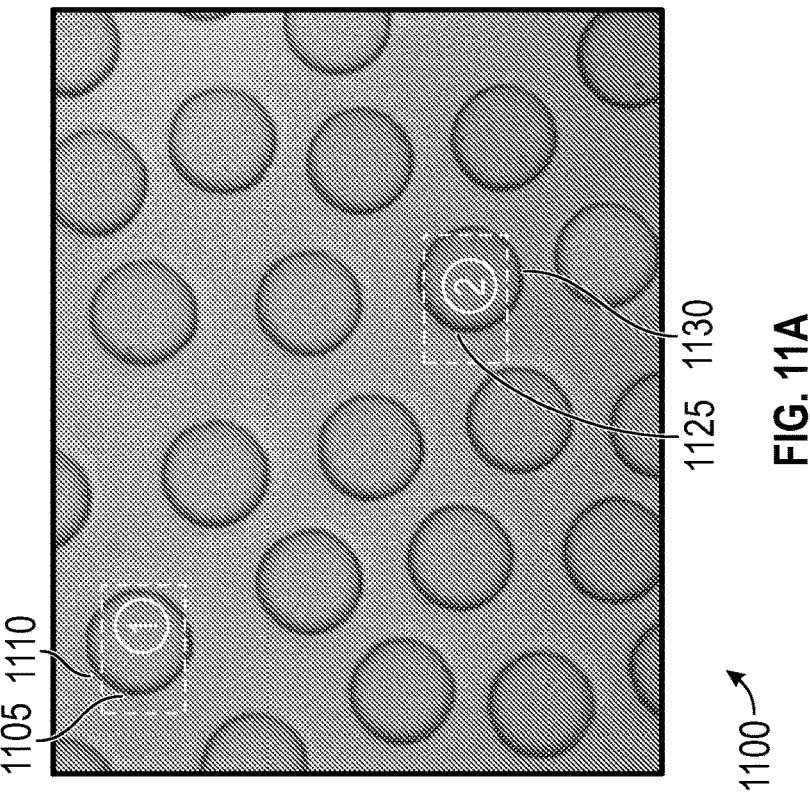
FIG. 11A depicts cells adhered to posts, in accordance with the disclosed embodiments.
Figure 11D:
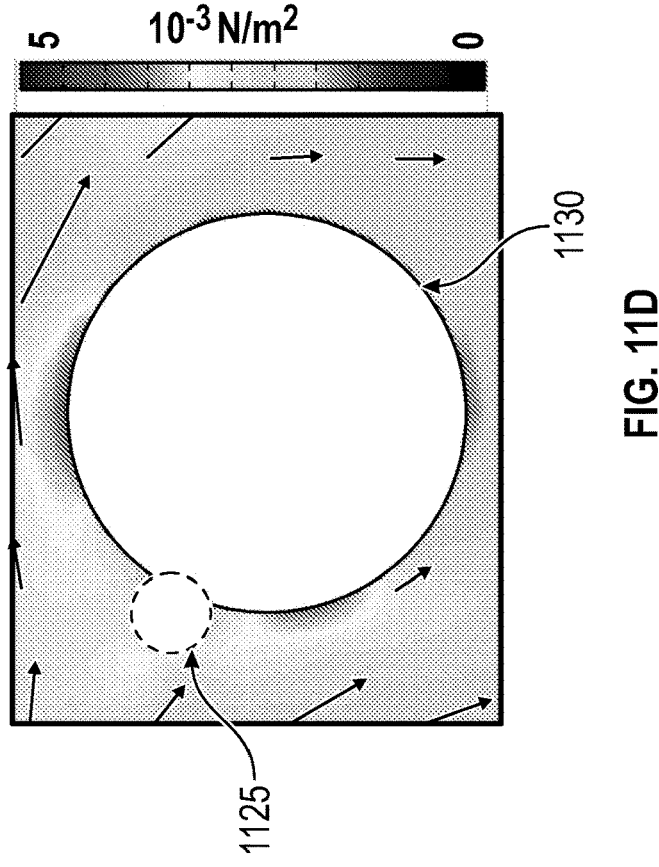
FIG. 11D depicts an exploded view of a cell adhered to a post and associated pressure fields in a test system, in accordance with the disclosed embodiments.
Figure 11C:
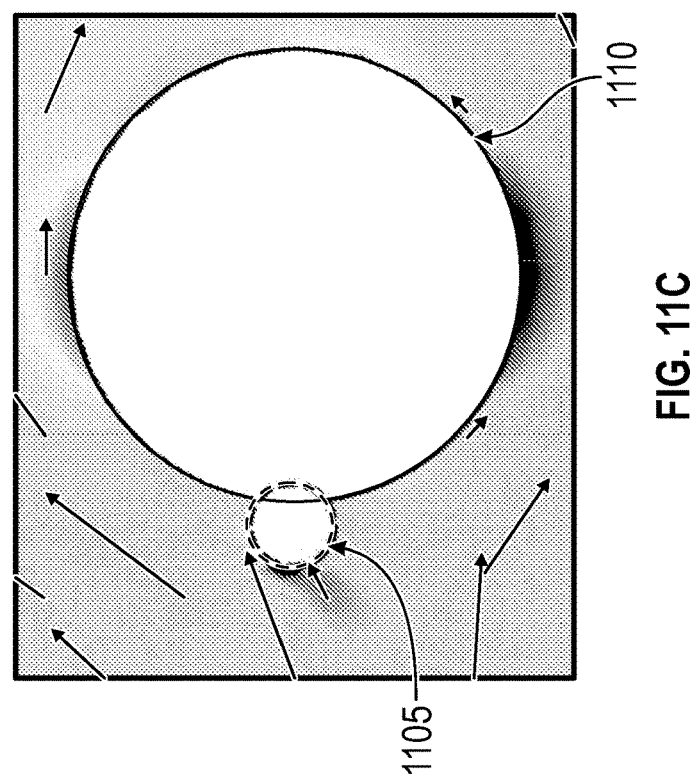
FIG. 11C depicts an exploded view of a cell adhered to a post and associated pressure fields in a test system, in accordance with the disclosed embodiments.

The relationship between cell adhesion position and cell subtype is illustrated in FIGS. 11A-11D. For example, consider cell 1 1105 in diagram 1100 in FIG. 11A. Assume the cell 1105 diameter is 20 μm, and the contact area is ¼ of the cell surface. The force needed to adhere the cell 1105 to the wall of the post 1110 is 6000 pN, which is the force provided by approximately 30 EpCAM antibody-antigen conjugations. This is illustrated in FIG. 11B which shows the pressure field 115 at cell 1105 is higher than the flow field 1120, at cell 2 1125 on post 1130. FIGS. 11C and 11D illustrate exploded views of the cells bound to the posts. The average EpCAM density for PC3 is 40 EpCAM/um2. As such, we can deduce that the EpCAM expression level in cell 1105 is lower than the average concentration. In general, cells that demonstrate a higher resistance to shear stress, can be determined to have higher EpCAM expression levels.

Thus, in certain embodiments, cells can be injected into the chip (with a speed of 0.1 mL/hr, for example). Optical and florescent images can be taken periodically. In certain embodiments, these images can be taken after one hour, and periodically thereafter. Shear stress analysis can then be performed based on the positions captured in the optical view to determine the positions which have higher shear and lower shear. The cells in the positions with higher shear have the higher expression in surface antigen than the cells in the positions with lower shear. The results can then be compared with the florescent image to confirm the cell type.

Figure 12:
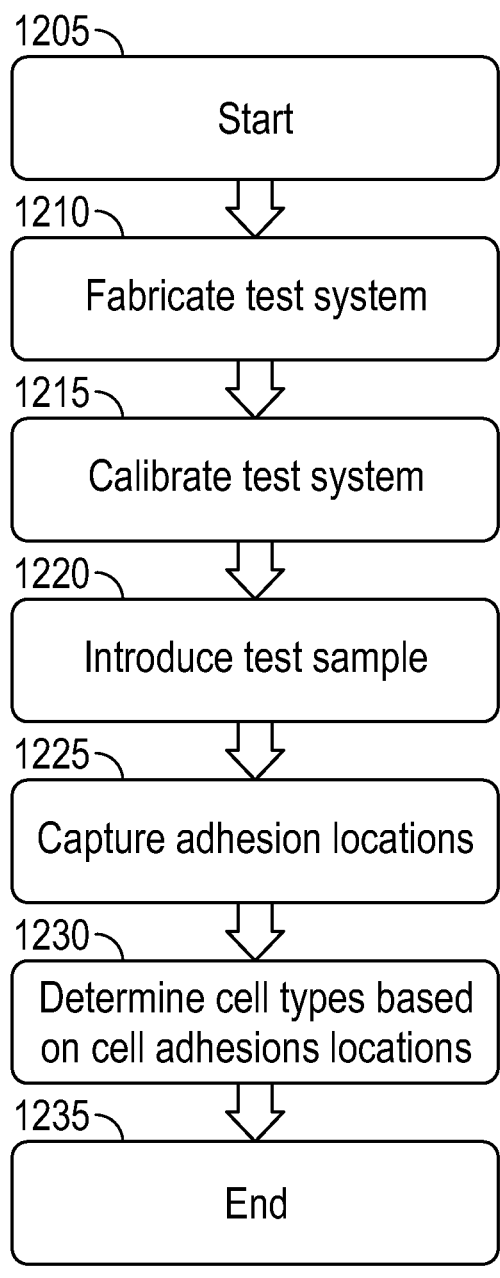
FIG. 12 depicts a flow chart of steps associated with a method for identifying cells using a test system, in accordance with the disclosed embodiments.

FIG. 12 illustrates steps in a cell identification method 1200 in accordance with the disclosed embodiments. The method 1200 begins at 1205.

As illustrated at 1210, a testing system, such as testing system 400 can be manufactured. The system 400 can include a substrate with a hyperuniform array of posts thereon. The system 400 can further include an inlet and outlet. The hyperuniform pattern can be generated by a computer system and can be arranged in multiple zones with different hyperuniform patterns. In certain embodiments, the substrate can comprise positively-charged polymers. A surface coating can be applied to the substrate and the microfluidic posts. The coating can be negatively-charged polymers, and poly-L-arginine or other positively-charged polymers.

At step 1215 the system can be calibrated. This can include using an imaging to capture flow rates of fluids in the system for various input pressures. The imaging system can provide the image data to a computer system which can be used to identify various flow rates at various locations in the system.

With the system calibrated, a test fluid of test cells (e.g., a blood sample) can be introduced to the test system at step 1220. The imaging system can then be used to collect image data of the system. The image data can include the locations where cells have adhered to the posts in the hyperuniform structure. This image data can also be provided to the computer system as shown at step 1225.

In order to determine the cell types, the image data can be analyzed at step 1230. The analysis can include identifying the adhesion force required for cells to bind various locations in the system 400. The adhesion force can be determined from the flow velocity at the various locations determined during the calibration step. Once the adhesion forces are determined, the system can correlate the adhesion force to the characteristics of the cell for cell identification. For example, since adhesion is primarily a function of the antigen and antibody conjugation, the cell's adhesion position can be related to the surface EpCAM expression level. The method ends at step 1235.

It should be appreciated that the embodiments disclosed herein can take advantage of cell adhesion locations to identify cell types. The disclosed embodiments include hyperuniform post configurations that result in unique local velocity flow characteristics. In certain exemplary embodiments, the velocity generated by a 0.2 mL/hr inlet flow is in the range of 0-5 mm/s, which is comparable with the blood stream velocity (0-16 mm/s). Integration of eight parallel channels in a microchip will achieve a flow rate of 1.6 mL/hr.

Figure 14A:
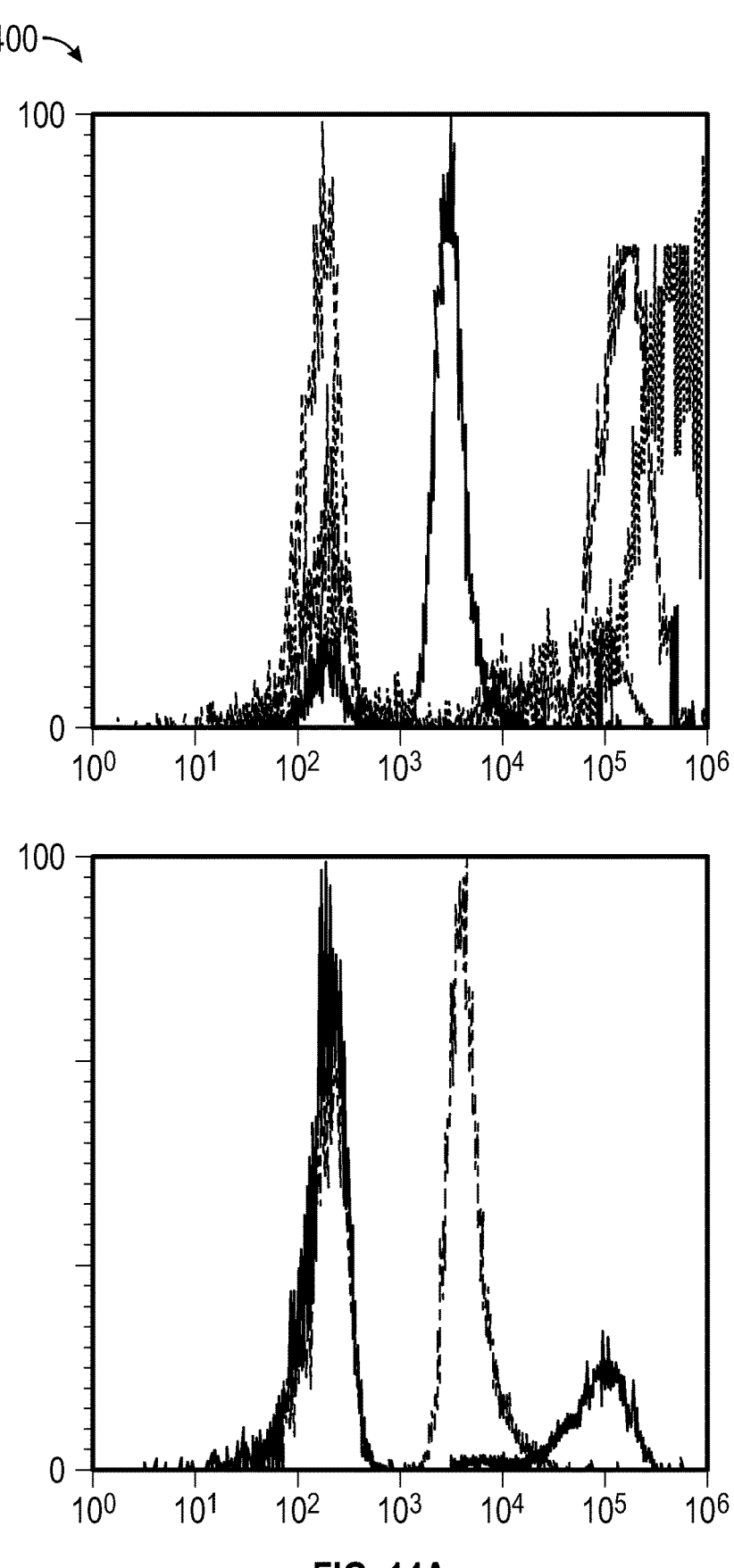
FIG. 14A illustrates charts of flow cytometry results of different blocking percentages and cell mixtures, in association with the disclosed embodiments.
Figure 14B:
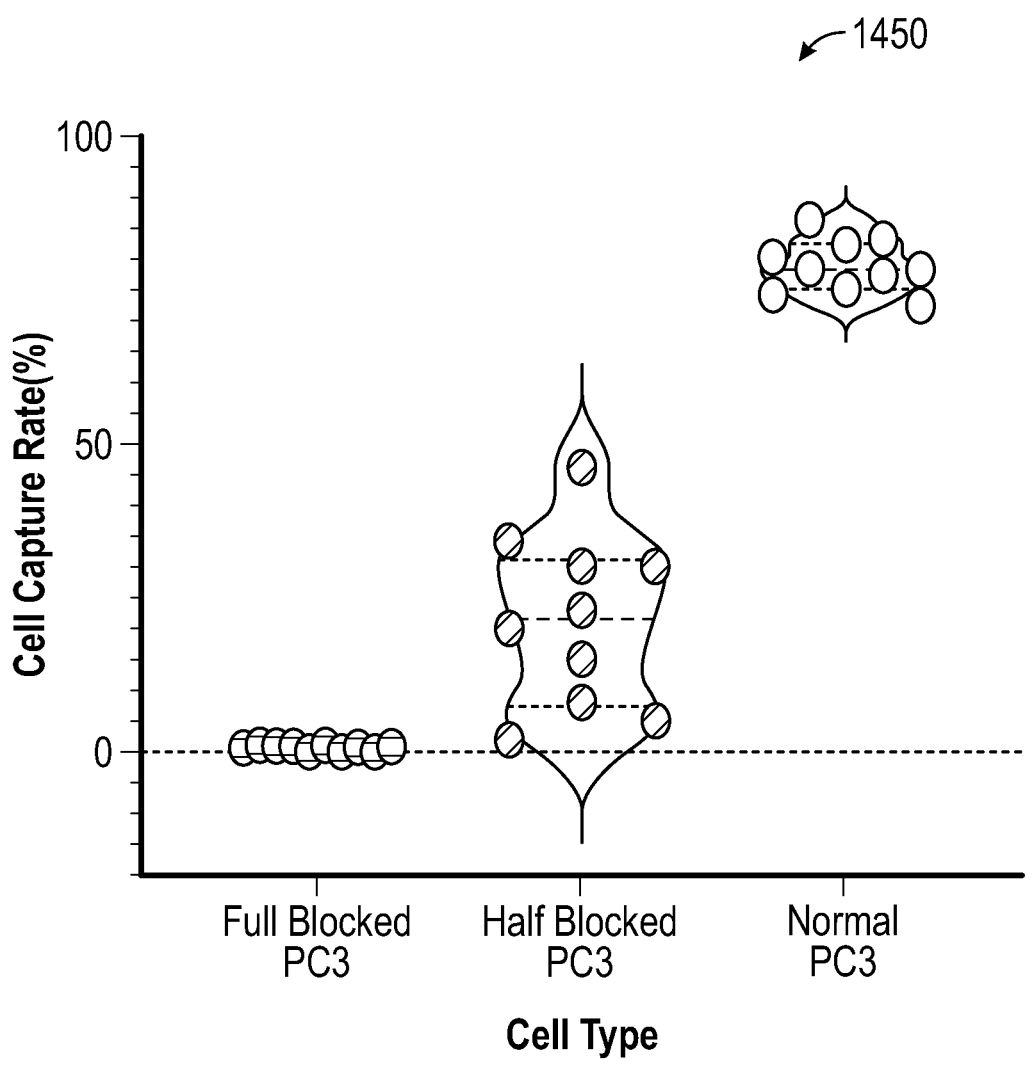
FIG. 14B illustrates chart of cell captures rates, in association with the disclosed embodiments.

Both experimental and simulated results demonstrate that the system provides blocking of surface antigen EpCAm using anti-EpCAM antibodies, as confirmed by flowcytometry as shown in chart 1400 of FIG. 14A. PC3 cells with antibody blocking will have lower EpCAM expression (PC3-b) on the surface than normal PC3 cells. The concentration of the Anti-EpCAM used in 100% blocking can be calculated by the average surface EpCAM expression of the PC3 cells (5×104 EpCAM/Cell). Then the amount of antibody needed for 75%, and 50% blocking can be calculated based on the concentration of 100% blocking. EpCAM-blocked PC3 cells showed lower capture efficiency. The capture efficiency of PC3 cells with 100% blocking, 50% blocking and no blocking is illustrated in chart 1450 of FIG. 14B.

A machine-learning model can be used to distinguish cell types, such as, for example, PC3 and DU145 cells, by analyzing static optical microscope images collected during calibration. Image classification can be accomplished by taking a large set of static images of cells (e.g., PC3 and DU145) with very high resolution. Individual cells are cropped and resized as individual training examples for the correct Coevolutionary Neural Networks (CNN) model. The images of each class are very similar in structure and cannot be distinguished with good human level performance. However, this may be accomplished with CNN architecture (i.e., ResNet-50) to extract higher level features from three channel images. The dataset of CTC images can be split into training, validation, and testing sets, to quantify the accuracy of the model.

The HU microchip 400 offers a simple and unique resolution for label-free fractionation of CTCs as its global homogeneity provides equal possibility for all CTCs to adhere; and local heterogeneity allows simultaneous differentiation of subpopulations by analyzing adhesive strength required for individual CTCs. As a result, subpopulations of CTCs can be identified using only their capture locations on the HU chip without requiring additional antibody-labeled classification.

The HU microchip can be used to profile CTC heterogeneity during cancer metastasis with respect to the numbers/fractions of CTCs with specific surface markers, quantitative expression of specific surface markers that relate to tumor progression, and dynamic change of biophysical properties of CTC subpopulations. The disclosed systems and methods can be used to isolate and identified CTC subpopulations non-destructively to ensure that downstream genomic and proteomic information collected reflects the true characteristics of these cells. Furthermore, HU microchip can be fabricated and packaged through standard manufacture processes, and only requires regular optical microscope and imaging equipment. It can therefore be easily integrated in research laboratories to study fundamental cancer biology questions that related to CTC heterogeneity, as well as in clinical settings for profiling CTC subpopulations to assist cancer diagnosis, predict tumor progression, and monitor therapeutic efficacy.

Based on the foregoing, it can be appreciated that a number of embodiments, preferred and alternative, are disclosed herein. In an embodiment, a system comprises a substrate, a microfluidic enclosure around the substrate, and a plurality of microposts configured on the substrate in a hyperuniform pattern. In an embodiment, the plurality of microposts comprises at least one of: columns, squares, and triangles. In an embodiment, the hyperuniform pattern further comprises multiple zones with different hyperuniform patterns.

In an embodiment, the system further comprises a fluidic input to the microfluidic enclosure configured to accept cells and a fluidic output from the microfluidic enclosure configured to accept cells.

In an embodiment, the substrate and the microfluidic enclosure are configured of at least one of: Polydimethylsiloxane, Polyethylene, Polycarbonate, Cyclo-olefin copolymer, and Polylactic acid.

In an embodiment, the substrate further comprises a nanostructured layers and positively-charged polymers. In an embodiment, the nanostructured layer comprises a silicon dioxide nanoparticle layer with a size of 5-200 nm. In an embodiment, the positively-charged polymers comprise at least one of a poly-L-arginine layer, a poly(allylamine hydrochloride) layer, a Poly-L-lysine layer, a low molecular weight chitosan layer, and a Diethylaminoethyl Dextran.

In an embodiment, the system further comprises a surface coating applied to the substrate and the plurality of microposts comprising: negatively-charged polymers and positively-charged polymers. In an embodiment, the negatively-charged polymers comprises at least one of: biotinylated alginate, Alginate, and Hyaluronic acid. In an embodiment, the positively-charged polymers comprise at least one of poly-L-arginine, a poly(allylamine hydrochloride) layer, a Poly-L-lysine layer, a low molecular weight chitosan layer, and a Diethylaminoethyl Dextran. In an embodiment, the surface coating further comprises at least one antibody that targets an antigen overexpressed on cancer cells. In an embodiment, the antibody comprises at least one of an Anti-EpCAM, an Anti-HER2, an Anti-EGFR, and a surface antigen on a cell surface, comprising one of Anti-CD4 and Anti-CD8.

In an embodiment, the system comprises an imaging device, the imaging device configured to capture image data of flow patterns of fluid and cell movement in the microfluidic enclosure. In an embodiment, the imaging device comprises at least one of a camera, a video camera, and a microscope.

In an embodiment, the system further comprises a computer system, said computer system comprising: at least one processor and a computer-usable medium embodying computer program code, the computer-usable medium capable of communicating with the at least one processor, the computer program code comprising instructions executable by the at least one processor and configured for: accepting input of the image data from the image device, determining flow rate data associated with cell flow through the microfluidic enclosure, and identifying at least one cell type according to the flow rate data.

In another embodiment, a method for cell identification comprises introducing a cell sample to a microchip comprising a hyperuniform configuration of microposts, capturing flow rates of the cell sample at least one location on the microchip, integrating images of the microchip to identify a flow field in the microchip, determining an adhesion force of at least one cell in the cell sample according to the captured flow rate, identifying locations on the microchip for capture certain types of cells based on cell-surface interaction, and identifying the at least one cell in the cell sample according to the determined adhesion force.

In an embodiment, microchip further comprises a substrate, a microfluidic enclosure around the substrate, a fluidic input to the microfluidic enclosure configured to accept cells, and a fluidic output from the microfluidic enclosure configured to accept cells.

In an embodiment the method further comprises applying a surface coating to the substrate and the plurality of microposts comprising: biotinylated alginate, Alginate, Hyaluronic acid, a poly-L-arginine layer, a poly(allylamine hydrochloride) layer, a Poly-L-lysine layer, a low molecular weight chitosan layer, and a Diethylaminoethyl Dextran.

In another embodiment, a microchip test system comprises a substrate, a microfluidic enclosure around the substrate, a plurality of microposts configured on the substrate in a hyperuniform pattern, an imaging device, the imaging device configured to capture image data of flow patterns of fluid and cell movement in the microfluidic enclosure; and a computer system, said computer system comprising: at least one processor; and a computer-usable medium embodying computer program code, the computer-usable medium capable of communicating with the at least one processor, the computer program code comprising instructions executable by the at least one processor and configured for: accepting input of the image data from the imaging device, determining flow rate data associated with cell flow through the microfluidic device, and identifying at least one cell type according to the flow rate data.

It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A system comprising:
a substrate comprising:
a nanostructured layer comprising a silicon dioxide nanoparticle layer with a size of 5-200 nm; and
positively-charged polymers;
a microfluidic enclosure around the substrate; and
a plurality of microposts configured on the substrate in a hyperuniform pattern.

2. The system of claim 1 wherein the plurality of microposts comprises at least one of:
columns;
squares; and
triangles.

3. The system of claim 1 wherein the hyperuniform pattern further comprises multiple zones with different hyperuniform patterns.

4. The system of claim 1 further comprising:
a fluidic input to the microfluidic enclosure configured to accept cells; and
a fluidic output from the microfluidic enclosure configured to accept cells.

5. The system of claim 1 wherein the substrate and the microfluidic enclosure are configured of at least one of:
Polydimethylsiloxane;
Polyethylene;
Polycarbonate;
Cyclo-olefin copolymer; and
Polylactic acid.

6. The system of claim 1 wherein the positively-charged polymers comprise at least one of:
a poly-L-arginine layer;
a poly(allylamine hydrochloride) layer;
a Poly-L-lysine layer;
a low molecular weight chitosan layer; and
a Diethylaminoethyl Dextran.

7. The system of claim 1 further comprising:
a surface coating applied to the substrate and the plurality of microposts comprising:
negatively-charged polymers; and
positively-charged polymers.

8. The system of claim 7 wherein the negatively-charged polymers comprises at least one of:
biotinylated alginate;
Alginate; and
Hyaluronic acid.

9. The system of claim 7 wherein the positively-charged polymers comprise at least one of:
poly-L-arginine;
a poly(allylamine hydrochloride) layer;
a Poly-L-lysine layer;
a low molecular weight chitosan layer; and
a Diethylaminoethyl Dextran.

10. The system of claim 7 wherein the surface coating further comprise:
at least one antibody that targets an antigen overexpressed on cancer cells.

11. The system of claim 10 wherein the antibody comprises at least one of:
an Anti-EpCAM;
an Anti-HER2;
an Anti-EGFR; and
a surface antigen on a cell surface, comprising one of:
Anti-CD4; and
Anti-CD8.

12. The system of claim 1 further comprising:
an imaging device, the imaging device configured to capture image data of flow patterns of fluid and cell movement in the microfluidic enclosure.

13. The system of claim 12 wherein the imaging device comprises at least one of:
a camera;
a video camera; and
a microscope.

14. The system of claim 13 further comprising:
a computer system, said computer system comprising:
at least one processor; and
a computer-usable medium embodying computer program code, the computer-usable medium capable of communicating with the at least one processor, the computer program code comprising instructions executable by the at least one processor and configured for:
accepting input of the image data from the image device;
determining flow rate data associated with cell flow through the microfluidic enclosure; and
identifying at least one cell type according to the flow rate data.

15. A method for cell identification comprising:
introducing a cell sample to a microchip comprising a hyperuniform configuration of microposts;
capturing flow rates of the cell sample at least one location on the microchip;
integrating images of the microchip to identify a flow field in the microchip;
determining an adhesion force of at least one cell in the cell sample according to the captured flow rate;
identifying locations on the microchip for capture certain types of cells based on cell-surface interaction; and
identifying the at least one cell in the cell sample according to the determined adhesion force.

16. The method of claim 15 wherein the microchip further comprises:
a substrate;
a microfluidic enclosure around the substrate;
a fluidic input to the microfluidic enclosure configured to accept cells; and
a fluidic output from the microfluidic enclosure configured to accept cells.

17. The method of claim 16 further comprising:

applying a surface coating to the substrate and the plurality of microposts comprising:

biotinylated alginate;

Alginate;

Hyaluronic acid;

a poly-L-arginine layer;

a poly(allylamine hydrochloride) layer;

a Poly-L-lysine layer;

a low molecular weight chitosan layer; and a Diethylaminoethyl Dextran.

18. A microchip test system comprising:

a substrate;

a microfluidic enclosure around the substrate;

a plurality of microposts configured on the substrate in a hyperuniform pattern;

an imaging device, the imaging device configured to capture image data of flow patterns of fluid and cell movement in the microfluidic enclosure; and a computer system, said computer system comprising:

at least one processor; and a computer-usable medium embodying computer program code, the computer-usable medium capable of communicating with the at least one processor, the computer program code comprising instructions executable by the at least one processor and configured for:

accepting input of the image data from the imaging device;

determining flow rate data associated with cell flow through the microfluidic device; and identifying at least one cell type according to the flow rate data.

\* \* \* \* \*